US007441198B2

United States Patent
Dempski et al.

(10) Patent No.: US 7,441,198 B2
(45) Date of Patent: Oct. 21, 2008

(54) VIRTUAL COLLABORATION WINDOW SYSTEM AND METHOD

(75) Inventors: Kelly L. Dempski, Evanston, IL (US); Mitu Singh, Glendale Heights, IL (US)

(73) Assignee: Accenture Global Services GmbH (CH)

( * ) Notice: Subject to any disclaimer, the term of this patent is extended or adjusted under 35 U.S.C. 154(b) by 230 days.

(21) Appl. No.: 11/303,302

(22) Filed: Dec. 16, 2005

(65) Prior Publication Data

US 2006/0092267 A1    May 4, 2006

Related U.S. Application Data

(63) Continuation of application No. 09/952,986, filed on Sep. 14, 2001, now Pat. No. 7,007,236.

(51) Int. Cl.
 *G09G 5/00* (2006.01)
(52) U.S. Cl. ...................... 715/757; 715/726
(58) Field of Classification Search ................. 715/757, 715/702, 727, 728, 729, 748, 749, 750, 751, 715/752, 756, 719–726, 848–852, 821–823; 345/629, 420, 619, 632
See application file for complete search history.

(56) References Cited

U.S. PATENT DOCUMENTS

| 5,563,988 | A |   | 10/1996 | Maes et al. |
|---|---|---|---|---|
| 5,959,667 | A | * | 9/1999 | Maeng ................. 348/211.99 |
| 6,057,856 | A | * | 5/2000 | Miyashita et al. .......... 345/633 |
| 6,181,343 | B1 |   | 1/2001 | Lyons |
| 6,195,104 | B1 | * | 2/2001 | Lyons ........................ 345/473 |
| 6,205,716 | B1 | * | 3/2001 | Peltz .......................... 52/36.2 |
| 6,215,498 | B1 | * | 4/2001 | Filo et al. .................. 345/419 |
| 6,222,465 | B1 |   | 4/2001 | Kumar et al. |

(Continued)

FOREIGN PATENT DOCUMENTS

WO        WO 00/55802          9/2000

OTHER PUBLICATIONS

Ishii, H., et al., "ClearBoard: A seamless medium for shared drawing and conversation with eye contact," Conference on Human Factors and Computing Systems (CHI-92), ACM SIGCHI, pp. 525-532, 1992.

(Continued)

*Primary Examiner*—Steven P Sax
(74) *Attorney, Agent, or Firm*—Brinks Hofer Gilson & Lione

(57) ABSTRACT

This invention is a method for manipulating virtual objects displayed on a video conference broadcast by generating a computerized three dimensional image of an object to be superimposed on a first video broadcast signal from a local video camera for display on a remote video monitor, and superimposing the same object on a second video broadcast signal from a remote video camera for display on a local video monitor, grabbing a portion of the three dimensional image by placing a hand in close proximity to the portion of the image moving the hand while maintaining the hand in close proximity to the image and regenerating the three dimensional image to a new perspective view corresponding to the movement of the image with the hand to create the appearance that the hand is manipulating a virtual object displayed over the video broadcast signal.

19 Claims, 1 Drawing Sheet

U.S. PATENT DOCUMENTS

| | | |
|---|---|---|
| 6,292,827 B1 * | 9/2001 | Raz .............................. 709/217 |
| 6,414,707 B1 * | 7/2002 | Agraharam et al. ....... 348/14.07 |
| 6,545,700 B1 * | 4/2003 | Monroe ................... 348/14.08 |
| 6,549,229 B1 | 4/2003 | Kirby et al. |
| 6,559,863 B1 * | 5/2003 | Megiddo ..................... 715/753 |
| 6,624,853 B1 * | 9/2003 | Latypov ..................... 348/722 |
| 6,684,062 B1 * | 1/2004 | Gosior et al. ................. 455/73 |
| 6,714,213 B1 * | 3/2004 | Lithicum et al. ............ 715/701 |
| 6,731,314 B1 | 5/2004 | Cheng et al. |
| 6,731,625 B1 * | 5/2004 | Eastep et al. ................ 370/352 |
| 6,831,640 B2 | 12/2004 | Shih et al. |
| 7,007,236 B2 * | 2/2006 | Dempski et al. ............ 715/757 |
| 7,136,090 B1 * | 11/2006 | McDuffie White ....... 348/14.16 |
| 7,193,633 B1 * | 3/2007 | Reinhardt et al. ........... 345/629 |
| 2003/0109322 A1 | 6/2003 | Funk et al. |
| 2004/0104935 A1 * | 6/2004 | Williamson et al. ......... 345/757 |
| 2004/0189870 A1 | 9/2004 | Champion et al. |

OTHER PUBLICATIONS

Ishii, H., Seamless Media: ClearBoard 1991-1994, pp. 1-4, http://web.media.mit.edu/~ishii/CB.html.

LaViola, J., et al., "Collaborative Conceptual Modeling Using the SKETCH Framework," in Proceedings of the First IASTED International Conference on Computer Graphics and Imaging, pp. 154-158, Jun. 1998.

International Search Report, dated Jan. 30, 2003, for corresponding international application No. PCT/EP02/10249.

European Patent Office Examination Report for corresponding European application No. 02777080.9, dated Sep. 7, 2007.

Noma, H., et al., "Multi-Point Virtual Space Teleconferencing System," *IEICE Transactions on Communications Society*, vol. E78-B, No. 7, Tokyo, Japan, Jul. 1995, pp. 970-979.

* cited by examiner

VIRTUAL COLLABORATION WINDOW SYSTEM AND METHOD

The present application is a continuation of U.S. patent application Ser. No. 09/952,986, filed Sep. 14, 2001 now U.S. Pat. No. 7,007,236, the entirety of which is hereby incorporated by reference.

BACKGROUND

This invention relates to video conferencing systems. More particularly, this invention relates to computer-generated images for shared viewing and manipulation on a video conferencing broadcast display monitor.

To enter a virtual reality environment, users must put on video display goggles and body position sensors. Their hands and/or bodies appear as a virtual image in the virtual reality environment, and can manipulate virtual objects in that environment as seen through their goggles. Multiple users can appear before one another as virtual persons in a single virtual reality environment. Users from remote distant locations can thereby have virtual meetings in that virtual environment, and view and manipulate virtual information and three-dimensional objects. Still, the participants cannot interact with each other as in a real face-to face meeting.

While virtual reality meetings may be common among networked virtual reality video games, video conferencing is the commonly accepted norm for conducting face-to-face meetings of business people between distant remote locations. The participants see real images of other participants at remote locations, but cannot readily share data or manipulate virtual objects as in virtual reality environments.

Still, many multi-national corporations use video conferencing systems to provide low-cost face-to-face meetings between colleagues at distant locations. To enhance communications at those meetings, some video conferencing systems permit computer generated images or presentations to be simultaneously broadcast to participants either in a pop-up window or as an alternate switchable display on the video monitors. Lately, enhancements to this have been provided for video conferencing over the Internet that permits the manipulation by distant participants of computer-generated documents, spreadsheets or drawings displayed in the separate pop-up window. While the sharing of such information enhances the communicative exchange at such video conferences, it does not replace actual meetings where detailed information concerning complex three-dimensional objects must be shared.

BRIEF SUMMARY OF THE INVENTION

The present invention meets the aforementioned need by merging video conferencing and three-dimensional computer development applications into a single collaboration tool. In one embodiment, the invention is a system that includes at each location a large video monitor with a touch screen, cameras associated with each monitor audio equipment, computer processing equipment and high bandwidth communication access. The components of the system cooperate to provide a video conference broadcast with a three-dimensional computer-generated image superimposed on the video broadcast. This image appears as a virtual object in the plane of the monitor that can be manipulated in response to a participant at any location touching the screen near the object to "grab" and move the object.

DETAILED DESCRIPTION

Figure 1:
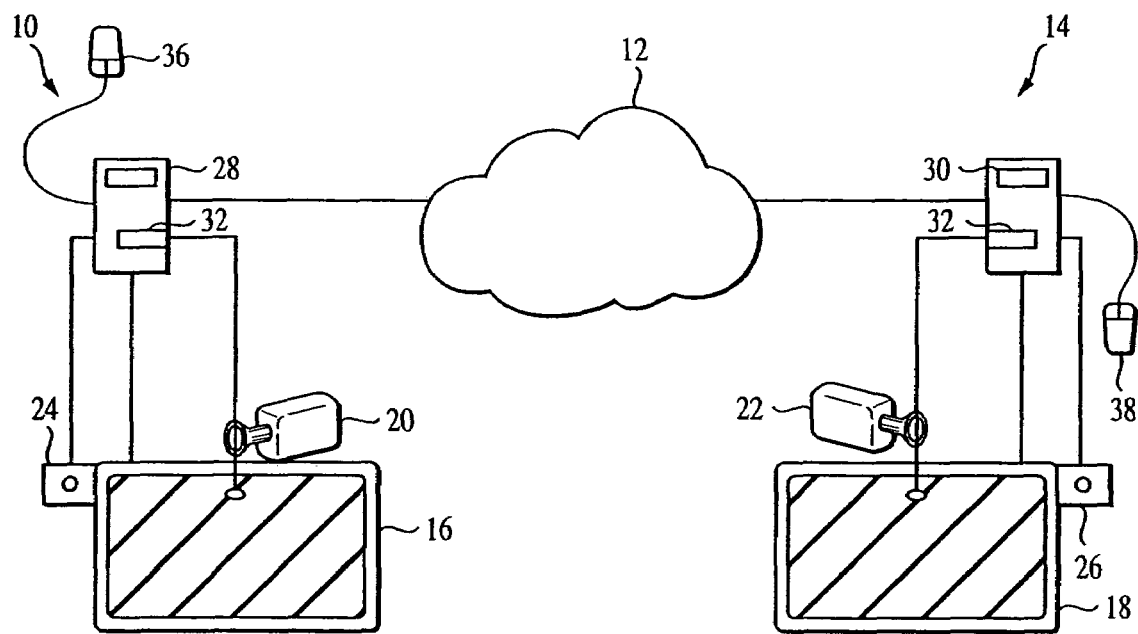
FIG. 1 is a schematic of one embodiment of a system, in accordance with the invention.

FIG. 1 depicts a preferred embodiment of the system of the present invention. A local video conferencing system 10 is connected via a high bandwidth communication network 12 to a remote location video conferencing system 14 in a peer-to-peer model. The video conferencing systems at either location include video display monitors 16 and 18, video cameras 20 and 22, touch screen input devices 24 and 26, which are connected to computer processing systems 28 and 30. The computer processing systems include video input cards 32 and 34, and they also include other input devices such as computer mouse 36 and 38. Other input devices may include joysticks, keyboards, track balls or video gesture recognition systems. The system may include voice recognition systems for integrated operation with voice commands.

The cameras and display, in one sense, act as a standard video conferencing equipment to broadcast the video image for display at the monitor of the remote location. However, with the cameras positioned over large monitors at each location with the appropriate camera lens focal length to project a life-size image, the video monitor appears as a window into the conference room at the remote location.

The system depicted in FIG. 1 is an overview of the video conferencing systems connected in a peer-to-peer model. Alternatively, the systems may be connected to a high bandwidth network in a client/server model, or other models of distributed processing. The software for controlling the virtual object may reside in the server on the network, locally in each peer, or in other distributions depending on the system processing model used to implement the invention. Such various distributed processing models have implemented for interactive networked video games.

The computer processor systems for controlling the image processing, wherever residing, have suitable software for generating three-dimensional images superimposed or overlaying the video broadcast image from the video cameras. As used herein, when a computer-generated image overlays or is superimposed on the video image, or vice versa, it should be understood that this refers to the apparent relationship between the computer-generated image and the video broadcast. The computer-generated image appears to float as a solid object in front of the video conference broadcast image. For example, this can be accomplished by generating a computer-generated image over a dark purple background. The video broadcast signal from the camera can then be digitized on a video input card and overlay the dark purple background of the three-dimensional computer-generated image with the result that the computer image appears to float over the video broadcast signal. This may also be accomplished by other techniques as are known to those of ordinary skill in the art.

Any suitable software language may be useful for this invention. For example, "Open GL" and "Direct X" are two such graphics programming languages that may be useful. Also, other higher-level languages that support a variety of applications, such as "SGI's Open Inventor," may be used.

Figure 2:
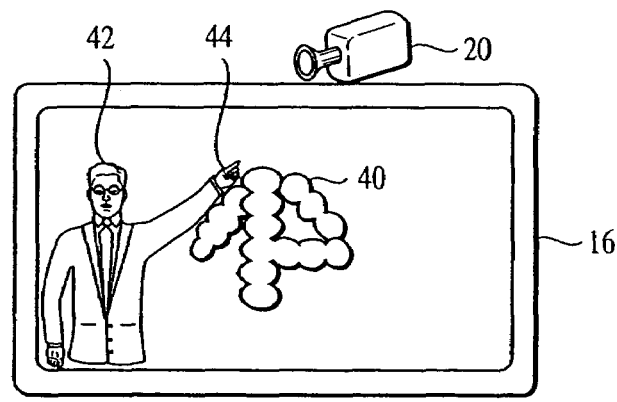
FIG. 2 is an illustration of a video display monitor with a virtual object.

FIG. 2 depicts the image that may be viewed on a video monitor 16. The video monitor displays a computer generated three-dimensional image 40 overlaying the video broadcast of a scientist 42 at a video conferencing system in a remote location. This three-dimensional object may be, for example, a three-dimensional rendering of a drug molecule under study by a group of scientists. The drug molecule 40 appears as a virtual three-dimensional object floating in space in the plane of the video display in front of the scientist. The video monitor appears to provide a "window" into the laboratory of the scientist and provides an augmented reality view by superimposing virtual objects on that window.

To enhance the reality of the displayed video broadcast to more resemble a "window" into the other room, it is preferred to make the video monitor as large as possible. Ideally, the monitor may be a 42-inch, or larger, flat panel video display hung on a wall at about the height of a typical window. Also, the camera is preferable positioned and has a suitable focal length so that the broadcast view of the room and participants therein appear life-size to viewers at the remote location. This gives the illusion that the participants are indeed standing behind the "window" in the next room.

Participants at any location may readily manipulate the virtual object 40. The hand 44 of the scientist, as shown in FIG. 2, appears to be grabbing the virtual object 40. When his hand is in contact with the touch screen input device near the virtual object, the computer system recognizes his touch as grabbing that portion of the object in close proximity to his touch. When the scientist moves his hand along the touch screen, the computer system moves, or rotates, the virtual object so that the touch portion of the object tracks along with the movement of the scientist's hand. The system may be set up to reposition the image for every movement of the hand of at least 0.5 centimeters to avoid shakiness. The resolution of movement should be set for the appropriate input device used by the scientist, however.

Likewise, a second scientist at a second location remote from a first location viewing the image as seen in FIG. 2, can reach out and grab the virtual object and move it as well. Scientist 42 would see the same virtual object as the scientist at the first local location, and would see the same object moved by the movement of the second scientist's hand on the touch screen.

In initiating the conference, the data for the virtual image can be transmitted from a computer at the first location to the computer at the second location. Preferably, in a peer-to-peer system model, the movement of the object is synchronized between the local computers. Each computer sensing a local manipulation of the object may re-render the object locally corresponding to the new position and/or rotation, and transmit the new position and/or rotation information to the computer at the distant location for that distant computer to re-render the virtual object with the new position and/or rotation.

In systems utilizing a central server, the central server could initially transmit the model for the virtual image to each local computer. As changes are made to the position and/or rotation of the object, each local computer transmits the positional information to the central server as well as to the other local computers for re-rendering the virtual image.

The system may provide a variety of different perspective views to the different locations as desired by the participants. For example, the system may present identical perspective views to each location, so that each participant sees the same side of the object with left-right elements correctly situated. The system may present mirror image views to each location, with left-right elements transposed but with the same side of the object seem by each participant. This allows the participants to touch the same portion of the object by apparently touching the same opposing portion of the "window." Or the system may present opposite perspectives views of the object that recreates the actual front-side and rear-side views of a real three-dimensional object floating between the respective participants. Preferably, the system provides the user with the option to select the perspective view most desirable for the specific application or object they are viewing.

According to the present invention, this method for manipulating virtual objects displayed on a video conference broadcast at a local and a remote location includes generating with a remote processor a three dimensional image of an object superimposed on a first video broadcast signal from a local video camera for display on a remote video monitor, and superimposing a corresponding image on a second video broadcast signal from a remote video camera for display on a local video monitor. This method includes grabbing a portion of the image by placing a real object in close proximity to the portion of the image to activate a touch sensitive screen, and then moving the real object while maintaining the real object in active coupling with the touch sensitive screen. The three dimensional image is regenerated by the computer to a new perspective view that corresponds to the movement or new location of the real object. This creates the appearance that the real object is manipulating the virtual object. Preferably, the real object is a person's fingers and/or hand and the person is located in front of one of either of the remote or local video monitor and within view of one of the remote or local video cameras. Nonetheless, the real object could easily be a stick, a pen, or other pointing device.

The method allows for the natural manipulation of the virtual object as though it were a real three dimensional object floating in the "window" between the two conference rooms. The method allows control by a person at either location at any time. The system may receive conflicting inputs as to how to move or manipulate the virtual object. In those situations, social conventions and etiquette will dictate how the virtual object or computer-generated image is manipulated. In other words, one person would have to socially defer to another person for control over the object, much as would occur if two people in the same room were trying to move an object in different directions at the same time.

In situations where social conventions for natural manipulation of the virtual object are problematic, controls can be set up to provide control of the object by one person or by one location at a time. The system may lockout other locations from then manipulating the object for a period of time thereafter, for example at least one second. Alternatively, the color of all or a portion of the object may change to indicate that a participant has taken "control" of the object as a more vibrant visual cue for other participants to not attempt to move the virtual object.

The method also provides for manipulating the object in response to signals from a voice recognition system integrated with a voice activated command structure. The virtual object may change color in its entirety to indicate that one location has control over the object. A portion of the object may change color to indicate that one participant has grabbed that portion of the object as it is being manipulated. The method also includes displaying markings, lines or other indicia drawn on the monitor by movement of a participant's finger across the touch sensitive screen or other input device.

The system can display static computer-generated three-dimensional virtual objects. It can also display animated three-dimensional virtual objects. In addition to moving and manipulating the animated object, the users would also be able to control the speed and direction of animation. The three-dimensional images and animations can be developed in any typical 3D CAD graphics applications and exported into a format suitable for working with this system. The format would depend on the type of graphics programming language in higher-level languages used on the computer systems. Such languages are commonly used in sophisticated computer video graphics systems.

Further, the objects could be manipulated in other ways such as stretching the objects, changing the color of the objects, actually drawing and building the objects displayed on the system. For example, complicated mechanical structures and designs such as airplane wings can be shown in unfinished format through this video conferencing system. Engineers at remote locations can interact with the virtual object of the airplane wing and "on the fly" re-design structural members or relocate parts. Likewise, scientists at pharmacy companies could use this invention to model designer drugs and show how drugs interact with enzymes and other bio-molecules.

While this invention has been shown and described in connection with the preferred embodiments, it is apparent that certain changes and modifications in addition to those mentioned above may be made from the basic features of this invention. In addition, there are many different types of computer software and hardware that may be utilized in practicing the invention, and the invention is not limited to the examples described above. Accordingly, it is the intention of the Applicants to protect all variations and modification within the valid scope of the present invention. It is intended that the invention be defined by the following claims, including all equivalents.

The invention claimed is:

1. A system for manipulating virtual objects displayed on a video image for a video conference broadcast, the system comprising:
    at least one locally arranged video monitor and at least one remotely arranged video monitor and operating as a display for the video conference broadcast;
    a video camera associated with each monitor for generating a video broadcast signal corresponding to the video image of the video conference broadcast;
    a manual input device associated with each monitor; and
    a computer processor system associated with each monitor and communicatively connected to a high bandwidth communication network;
    wherein each processor system displays a three-dimensional virtual object superimposed on or overlaying the video image of the video conference broadcast on each associated monitor to provide an augmented reality view, and is adapted to detect new position and new rotation of the virtual object corresponding to a local manipulation of the virtual object from each associated manual input device and transmit a signal representative of the new position and the new rotation to the other of the processor systems;
    wherein the processor systems are capable of generating a plurality of perspective views of the three-dimensional virtual object and upon selection of a first view, the processor systems display the same side of the virtual object locally and remotely and upon selection of a second view, the processor systems display a different side of the virtual object remotely and locally.

2. The system of claim 1 wherein said manual input device is at least one of a mouse, a joystick, a trackball, a touch screen, or a video gesture recognition system.

3. The system of claim 1 wherein said manual input device is a touch screen integrated with said video monitor.

4. The system of claim 1 wherein each processor system has a video input card, and each camera is connected to said video input card in each associated processor system.

5. The system of claim 1 wherein the computer processor system further includes voice recognition software for receiving voice commands for manipulating the displayed virtual objects.

6. A system for manipulating virtual objects displayed on a video image for a video conference broadcast, the system comprising:
    at least two video monitors configured to be remotely located at multiple locations and operating as a display for the video conference broadcast;
    a video camera associated with each monitor for generating a video broadcast signal corresponding to the video image of the video conference broadcast;
    a manual input device associated with each monitor;
    a video processor system coupled to each of said monitor, and corresponding associated video camera and input device,
    a computer processor system communicatively connected to a high bandwidth communication network and each video processor system, wherein the computer processor system displays a three-dimensional virtual object superimposed on or overlaying the video image of the video conference broadcast on each monitor to provide an augmented reality view and is adapted to receive a signal from each manual input device and to manipulate the virtual object in response thereto,
    wherein the computer processor system operates to process an image data for the three-dimensional virtual object in a first mode and in a second mode, the computer processor system, in the first mode, updating a display corresponding to the image data in response to the signal from each manual input signal received from the multiple locations and in the second mode, setting up a visual cue that indicates the manipulation of the virtual object by a selected one of the multiple locations at a time.

7. The system of claim 6 wherein the manual input device is a touch sensitive screen integrated with the video monitor.

8. The system of claim 7 wherein the video monitor is a flat panel display of sufficient size and the associated video camera is of sufficient focal length and positioning with respect to the video monitor to display apparent life size views of participants from a first location of the multiple locations as seen from the perspective of participants at a second location of the multiple locations.

9. The system of claim 6 further comprising a voice recognition system and a voice activated command structure for assisting the manipulation of the virtual object.

10. A method for manipulating a virtual object displayed on a video conference broadcast at a local and a remote location, the method comprising:
    a) generating with a remote processor a three-dimensional image of the virtual object overlaying a first video broadcast signal from a local video camera for display on a remote video monitor operating as a display for the video conference broadcast to provide an augmented reality view;
    b) generating with a local processor a three-dimensional image of the virtual object overlaying a second video broadcast signal from a remote video camera for display on a local video monitor operating as a display for the video conference broadcast to provide the augmented reality view;
    c) grabbing a portion of the virtual object displayed at one of the local and remote locations by placing a real object in close proximity to the portion of the displayed image to activate a touch-sensitive screen;

d) moving the real object while maintaining the real object in active coupling with the touch-sensitive screen;

e) regenerating the three-dimensional image at each of the local and remote locations to correspond to the movement of the real object thereby providing the appearance to viewers at the local and remote locations that the real object is manipulating a virtual object; and f) selecting a perspective view of the virtual object at each of the local and remote locations wherein upon selection of a first view, displaying the same side of the virtual object displays at the local and remote locations; and upon selection of a second view, displaying a different side of the virtual object at each of the local and remote locations.

11. The method of claim 10, further comprising: prior to (e), detecting a new position and a new rotation of the virtual object corresponding to the grabbing of the portion of the virtual object.

12. The method of claim 11, further comprising: prior to (e), transmitting the new position and the new rotation of the virtual object to the remote location.

13. The method of claim 10 further comprising: recreating a front side view of the virtual object at the local location and a rear side view of the virtual object at the remote location; wherein the first perspective view displays the front side of the virtual object and the second perspective view displays the rear side of the virtual object.

14. The method of claim 10 further comprising: prior to (d), locking out grabbing of the portion of the virtual object at the one of the local and the remote locations that does not manipulate the virtual object.

15. The method of claim 14 further comprising: upon conflicting inputs at the local and remote locations, determining a control over the grabbing of the virtual object based on social conventions and etiquette.

16. The method of claim 10 wherein e) regenerating the three-dimensional image at each of the local and remote locations to correspond to the movement comprises regenerating the three-dimensional image of the virtual object having a complete design from the three-dimensional image of the virtual object in unfinished format.

17. The method of claim 10 wherein c) grabbing a portion of the virtual object comprises stretching the portion of the virtual object.

18. The method of claim 10 further comprising: displaying at least a first part of the three-dimensional image of the virtual object in a first color in response to the manipulation of the first part of the virtual object.

19. The method according to claim 18 further comprising: displaying at least a second part of the virtual object in a second color in response to the manipulation of the second part of the virtual object.

* * * * *

UNITED STATES PATENT AND TRADEMARK OFFICE
CERTIFICATE OF CORRECTION

PATENT NO. : 7,441,198 B2
APPLICATION NO. : 11/303302
DATED : October 21, 2008
INVENTOR(S) : Kelly L. Dempski et al.

It is certified that error appears in the above-identified patent and that said Letters Patent is hereby corrected as shown below:

On the Title Page

Line 3, Item [57] under "ABSTRACT", delete "three dimensional" and substitute --three-dimensional-- in its place.

Line 8, Item [57] under "ABSTRACT", delete "three dimensional" and substitute --three-dimensional-- in its place.

Line 11, Item [57] under "ABSTRACT", delete "three dimensional" and substitute --three-dimensional-- in its place.

In the Specification

In column 1, line 26, before "meeting." delete "face-to face" and substitute --face-to-face-- in its place.

In column 2, line 21, after "joysticks, keyboards," delete "track balls" and substitute --trackballs-- in its place.

In column 2, line 65, after "monitor displays a" delete "computer generated" and substitute --computer-generated-- in its place.

In column 3, line 14, after "the camera is" delete "preferable" and substitute --preferably-- in its place.

In column 3, line 63, after "the object" delete "seem" and substitute --seen-- in its place.

In column 3, line 66, after "present opposite" delete "perspectives" and substitute --perspective-- in its place.

In column 4, line 8, delete "three dimensional" and substitute --three-dimensional-- in its place.

In column 4, lines 17-18, after "sensitive screen. The" delete "three dimensional" and substitute --three-dimensional-- in its place.

UNITED STATES PATENT AND TRADEMARK OFFICE
CERTIFICATE OF CORRECTION

PATENT NO. : 7,441,198 B2
APPLICATION NO. : 11/303302
DATED : October 21, 2008
INVENTOR(S) : Kelly L. Dempski et al.

It is certified that error appears in the above-identified patent and that said Letters Patent is hereby corrected as shown below:

In the Specification (cont'd)

In column 4, line 28, after "it were a real" delete "three dimensional" and substitute --three-dimensional-- in its place.

Signed and Sealed this

Thirtieth Day of June, 2009

JOHN DOLL
*Acting Director of the United States Patent and Trademark Office*